United States Patent
Sundararaman et al.

(10) Patent No.: US 8,225,232 B2
(45) Date of Patent: Jul. 17, 2012

(54) DYNAMIC CONFIGURATION OF UNIFIED MESSAGING STATE CHANGES

(75) Inventors: Sridhar Sundararaman, Bellevue, WA (US); Srinivasa Reddy Manda, Sammamish, WA (US); David A. Howell, Seattle, WA (US); James M. Lyon, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 783 days.

(21) Appl. No.: 11/068,691

(22) Filed: Feb. 28, 2005

(65) Prior Publication Data

US 2007/0055751 A1    Mar. 8, 2007

(51) Int. Cl.
*G06F 3/048* (2006.01)
*G06F 3/00* (2006.01)

(52) U.S. Cl. ........ 715/811; 715/717; 715/727; 715/763; 715/810

(58) Field of Classification Search .................. 715/717, 715/727, 737, 763, 810–811
See application file for complete search history.

(56) References Cited

U.S. PATENT DOCUMENTS

| | | | |
|---|---|---|---|
| 6,430,177 B1 * | 8/2002 | Luzeski et al. | 370/356 |
| 6,493,703 B1 * | 12/2002 | Knight et al. | 707/3 |
| 6,581,091 B1 * | 6/2003 | Ruckmann et al. | 709/219 |
| 6,816,468 B1 * | 11/2004 | Cruickshank | 370/260 |
| 6,975,913 B2 * | 12/2005 | Kreidler et al. | 700/96 |
| 7,447,624 B2 | 11/2008 | Fuhrmann | |
| 7,577,561 B2 | 8/2009 | McEntee | |
| 2003/0018721 A1 * | 1/2003 | Gupta et al. | 709/206 |
| 2004/0153306 A1 | 8/2004 | Tanner | |
| 2004/0203664 A1 * | 10/2004 | Lei et al. | 455/414.1 |
| 2007/0203708 A1 | 8/2007 | Polcyn | |
| 2008/0189096 A1 | 8/2008 | Apte | |
| 2008/0221896 A1 | 9/2008 | Cai | |
| 2011/0224972 A1 | 9/2011 | Millett et al. | |

FOREIGN PATENT DOCUMENTS

| | | |
|---|---|---|
| EP | 0 558 224 | 9/1993 |
| EP | 1014653 | 6/2000 |
| EP | 1014653 A2 * | 6/2000 |
| EP | 1113631 | 7/2001 |
| EP | 1298905 | 4/2003 |
| JP | 2003-078861 | 4/1991 |
| JP | 05-289840 | 11/1993 |
| JP | 07-078047 | 3/1995 |
| JP | 2002-524806 | 8/2002 |
| JP | 2003-030422 | 1/2003 |

(Continued)

OTHER PUBLICATIONS

Aadil Mansoor. Telephony. http://project.uet.itgo.com/telephon.htm. Last accessed Jan. 31, 2005. 13 pages.

(Continued)

*Primary Examiner* — Nicholas Augustine
(74) *Attorney, Agent, or Firm* — Merchant & Gould P.C.

(57) ABSTRACT

The subject invention relates to systems and methods that enable dynamic programming and execution of an electronic communications dialog. In one aspect, a configurable messaging system is provided. The system includes a configuration file to describe interface options of a computerized dialog session, wherein the configuration file specifies interface activities and state transitions between the interface options within the configuration file. A state controller executes the interface options during communications activities with the dialog session. The configuration file can also describe prompt elements to solicit information from users or applications.

18 Claims, 10 Drawing Sheets

FOREIGN PATENT DOCUMENTS

| | | |
|---|---|---|
| JP | 2003-030541 | 1/2003 |
| JP | 2003-060790 | 2/2003 |
| JP | 2003-115929 | 4/2003 |
| JP | 2003-186793 | 4/2003 |
| JP | 2004-341909 | 12/2004 |

OTHER PUBLICATIONS

Harry E. Blanchard, et al. Voice Messaging User Interface. http://www.hblanchard.com/pubs/Blanchard_Voice_Messaging.pdf#search='user%20interface%20dtmf%20applications%20state%20machine. Last accessed Jan. 31, 2005.

Scott McGlashan, et al. Voice Extensible Markup Language (VoiceXML) Version 2.0. W3C Working Draft, Oct. 23, 2001. http://www.w3.org/TR/2001/WD-voicexml20-20011023/. Last accessed Jan. 31, 2005.

European Search Report dated Jun. 21, 2006, for European Patent Application Serial No. EP06100666, 3 pages.

Modeling System of User Interface Based on Metamodel; English Abstract included at p. 9; Mar. 31, 2004; 56 pages.

Assouad et al., Build Voice Presentation Layers for Delivering Applications to Phones, Copyright © 1994-2009 SYS-CON Media, 9 pages.

Overview of Unified Messaging, Copyright 2010, 21 pages.

Upgrading Speech Application SDK Version 1.0 Applications, Copyright 2010, 4 pages.

Hunt et al.; Speech Recognition Grammar Specification, Version 1.0, Mar. 16, 2004, 78 pages.

Japanese Notice of Rejection (translated) mailed on Feb. 1, 2011 for JP Patent Application No. 2006-017381, 3 pages.

Chinese Fourth Office Action (with English Summary) mailed on Jun. 15, 2011 for Chinese Patent Application No. 200610004622.7, 11 pages.

Notice of Rejection (English Translation) mailed on Mar. 6, 2012 for Japanese Patent Application No. 2006-017381, 7 pages.

\* cited by examiner

DYNAMIC CONFIGURATION OF UNIFIED MESSAGING STATE CHANGES

TECHNICAL FIELD

The subject invention relates generally to computer systems, and more particularly, the subject invention relates to systems and methods that facilitate dynamic configuration of menu driven communications applications via file declarations that specify menu activities, prompts, or transitions in a flexible, granular, and explicit manner and which are outside the domain of hard coded state machines or document servers.

BACKGROUND OF THE INVENTION

Communications technologies are at the forefront of rapidly changing requirements of the information age. Only a few short years ago, fax machine technologies threatened the traditional way of receiving information in the mail by electronically encoding content and delivering messages over phone lines. This technology revolutionized the way business had been conducted for hundreds of years. Almost as soon as fax machines became ubiquitous, a new technology known as electronic mail or e-mail began to overtake many applications that were previously and exclusively in the domain of fax machines. As e-mail applications grew, still yet other communications technologies evolved such as Instant Messaging services which again threatened older forms of communications. Along with text driven technologies such as e-mail and fax machines, voice communications have also changed from hard wired connections to the ever popular and growing wireless technologies of today.

In order to manage the wide range of communications options that are available to many users, Unified Messaging (UM) applications have begun to appear that provide a service for handling the many communications options available to users. Unified Messaging generally implies the integration of voice, fax, e-mail, and the like allowing a user to access any of these messages, anywhere, anytime, from any terminal of choice. One goal of a Unified Messaging system is to simplify and speed up communication processes to achieve time and cost savings within a corporation or other entity.

One common feature of modern communications systems is that users are generally given various configuration options from different style menus in order to tailor these systems for particular communications preferences. Thus, voice mail, Unified Messaging and other Intelligent Voice Recognition (IVR) applications have user interfaces that are typically menu driven. A menu consists of one or more prompts that can be played to an end-user on the phone, for example. At the end of the prompt, the user responds with a dual tone multi frequency (DTMF) input that causes the application to change to a different menu. One problem with current technologies is that various application implementations use finite state machines to map these menu changes. Typically these implementations hard code the menu state changes making it difficult to extend and customize the menus.

In one attempt to relieve the burdens of the hard coded nature and control elements for processing messages, technologies such as Voice Extensible Markup Language (VoiceXML) have emerged. A goal of VoiceXML is to bring the full power of Web development and content delivery to voice response applications, and to free the authors of such applications from lower level programming and resource management. It enables integration of voice services with data services using a familiar client-server paradigm. A voice service is viewed as a sequence of interaction dialogs between a user and an implementation platform. The dialogs are provided by document servers, which may be external to a respective implementation platform. Document servers maintain overall service logic, perform database and legacy system operations, and produce dialogs.

A VoiceXML document (or a set of related documents called an application) forms a conversational finite state machine. The user is always in one conversational state, or dialog, at a time. Each dialog determines the next dialog to transition to. Transitions are specified with URIs, which define the next document and dialog to use. If a URI does not refer to a document, the current document is assumed. If it does not refer to a dialog, the first dialog in the document is assumed. Execution is terminated when a dialog does not specify a successor, or if it has an element that explicitly exits the conversation. One problem with how state transitions are processed in VoiceXML relates to the fact that a state change can specify a new document to be retrieved by the document server. Thus, any interaction with a particular user generally requires many transactions with the document server in order to complete a given dialog session. As the number of users grows, the load on respective document servers can become unmanageable. This may cause further resources to be expended such as adding more servers to process the load. Another inefficiency within the documents themselves relate to the amount of scripting code that is required in order to properly transition from one document or dialog to another.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention relates to systems and methods that control menu driven activities for various messaging applications in a flexible and efficient manner. In one aspect, a configuration file specifies activities, prompts, and/or transitions of a dialog interface in a communications system. The activities and transitions are explicitly called out within the configuration file and form a dialog session for user interactions with the communications system. Respective prompts can be specified within the configuration file that provides the user with communications options during the dialog (e.g., select "1" to leave a voice mail or select "2" to exit). By controlling dialog state and transitions to other states within the confines of the configuration file, communications interface can be achieved with a plurality of users without having to rely on multiple interactions with an outside server during changing dialog conditions with each respective user.

The configuration file provides a convenient and dynamic mechanism to allow administrators to easily adapt dialog menus as system requirements change overtime. For example, the configuration files can be coded in a language such as XML where changes to a given interface can be specified as new or different activities which lead to new or different state transitions for the dialog, if necessary. In one specific example, a dialog may initially be delivered in the English language with options for dialog interactions being provided in English. Overtime, it may be desired to add subsequent language interface options for non-English speaking users. Since the configuration file is adaptable and programmable, the administrator can easily specify the new language options within the configuration file and without causing modifications to the underlying communications system to implement such changes.

To the accomplishment of the foregoing and related ends, certain illustrative aspects of the invention are described herein in connection with the following description and the annexed drawings. These aspects are indicative of various ways in which the invention may be practiced, all of which are intended to be covered by the subject invention. Other advantages and novel features of the invention may become apparent from the following detailed description of the invention when considered in conjunction with the drawings.

DETAILED DESCRIPTION OF THE INVENTION

The subject invention relates to systems and methods that enable dynamic programming and execution of an electronic communications dialog. In one aspect, a configurable messaging system is provided. The system includes a configuration file to describe interface options of a computerized dialog session (e.g., electronic menu of options to interact with a unified messaging application). The configuration file specifies interface activities and state transitions between the interface options within the configuration file which mitigates unnecessary interactions with outside communications servers. A state controller executes the interface options during communications activities with the dialog session. The configuration file also describes prompt elements to solicit information from users or applications which allows changes to be made to a given dialog in a flexible and efficient manner.

As used in this application, the terms "component," "file," "system," "object," "controller," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
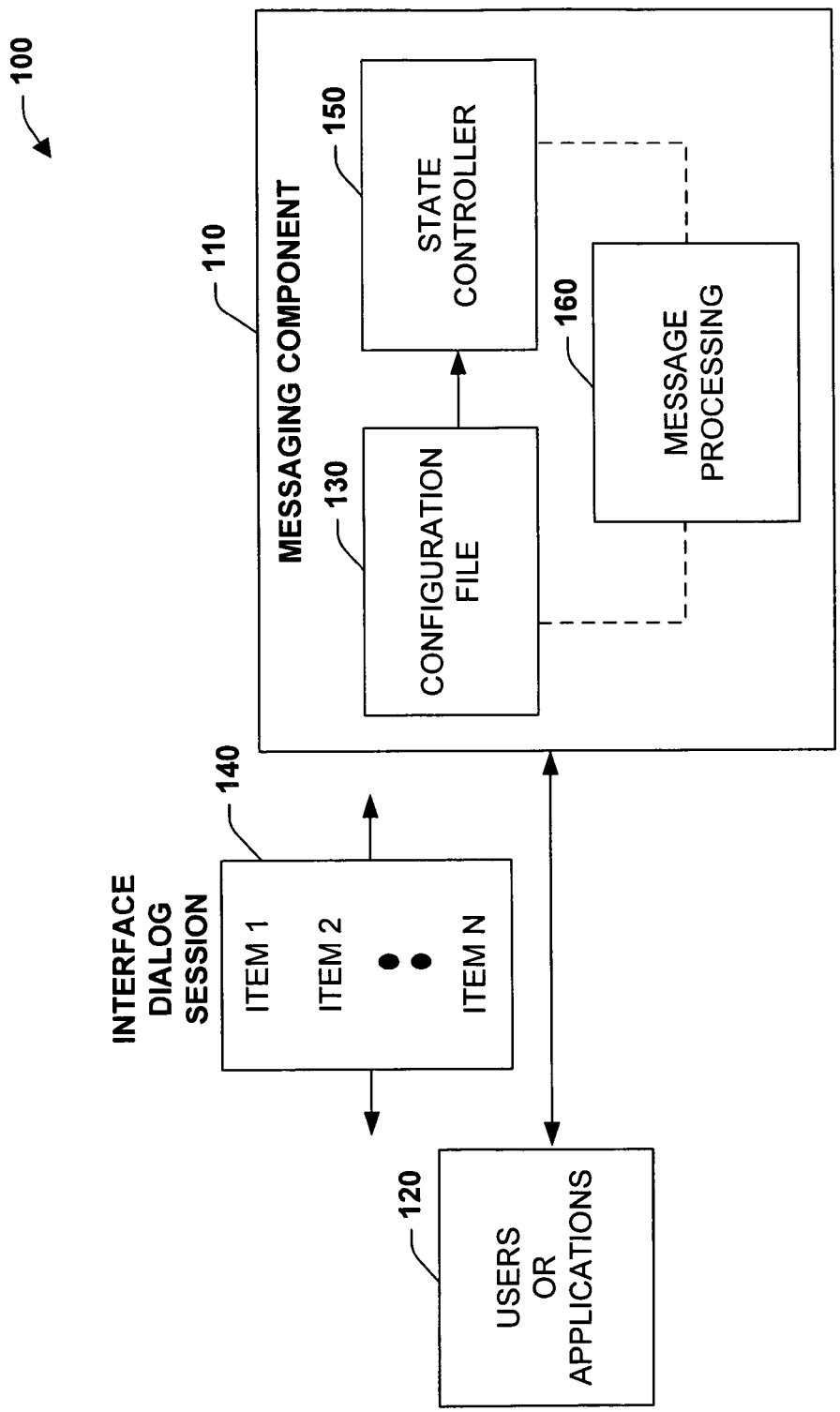
FIG. 1 is a schematic block diagram illustrating a configurable messaging system in accordance with an aspect of the subject invention.

Referring initially to FIG. 1, a configurable messaging system 100 is illustrated in accordance with an aspect of the subject invention. The system 100 includes a messaging component 110 that interacts with one or more users and/or automated applications 120 to facilitate processing of various communications applications. The messaging component 110 can be associated with various applications such as Unified Messaging applications, voice mail processing, or substantially any type of voice recognition application. Typically, interactions with the messaging component 110 are through dual tone multi frequency (DTMF) inputs but other type of inputs such as speech or text inputs can operate as well.

In general, a configuration file 130 stores groups of instructions or commands that drive an interface dialog session 140 with the user or applications 120. Such instructions or commands can cause the dialog session 140 to generate and process one or more items of a menu for example, that collectively controls interactions with the user or applications 120. For example, a first item could be related to a greeting that identifies a session, a second item could ask for a password input, and a third item could request that a voice mail message be recorded in a file associated with the messaging component 110. As will be described in more detail below, the configuration file can specify activities, prompts, or transitions, that control the dialog session 140 and ultimately how the messaging component interacts with the users or applications 120.

The configuration file 130 generally specifies what activities are to be achieved in the dialog session 140 and which state to transition to after a given activity has completed or aborted, for example. The states are managed by a state controller 150 which directs a message processing component 160 (or components such as a service) to perform some action in the system 100 (e.g., record voice mail, playback message, examine user input, and so forth). The configuration file 130 allows administrators to dynamically adapt functionality of the messaging component 110 for a plurality of diverse communications applications. This is achieved by specifying dialog interactions or commands in an Extensible Markup Language (XML) or other type language that cooperate to control the state of the messaging component 110. In this case, instructions within the configuration file 130 remove hard coded state implementations from the state controller 150 and allow administrators to adapt to changing situations without also having to modify the state controller after making the changes.

Since transitions to other states are contained within the configuration file 130, dialog control can be dynamically specified on a granular level for a given dialog session 140 (e.g., specify transitions as a group within the file and not to an external document) while mitigating interactions with other computers/components to determine appropriate states or actions of the system 100. Thus, the subject invention facilitates configuring menus and its transitions for the dialog session 140 in an XML file (or other type) rather than hard coding these aspects in the state controller 150. This feature facilitates extensibility, wherein new menus and transitions can be added without change to the messaging component 110. Also, the configuration file 130 reduces application development time and allows customization whereby an administrator and end-user can potentially add new menus and change existing menu transitions to fit their needs. Other aspects include language support to add prompts, menus and transitions in other languages (e.g., German, French, English, and so forth), by merely modifying the configuration file 130 (or files) while the underlying application implementation of the messaging system 100 can remain unchanged.

Figure 2:
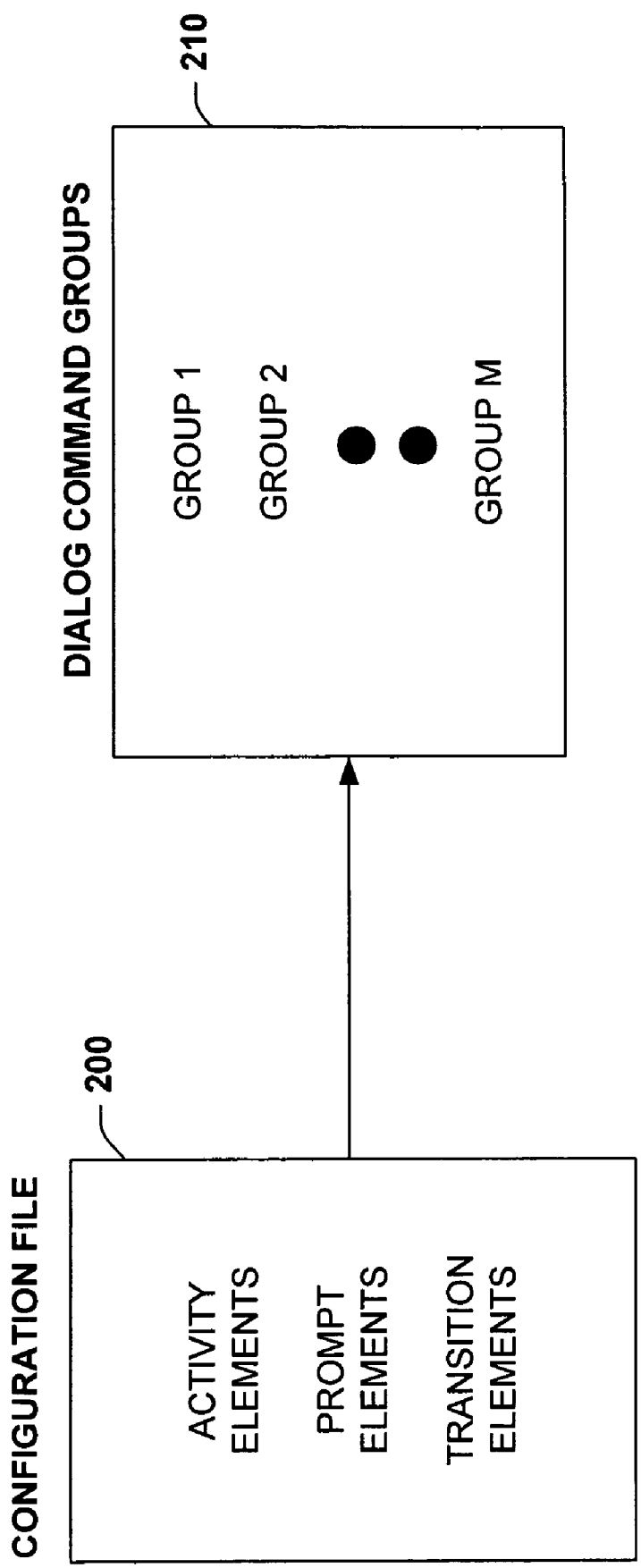
FIG. 2 is a block diagram illustrating an exemplary configuration file in accordance with an aspect of the subject invention.

Referring now to FIG. 2, an exemplary configuration file 200 is illustrated in accordance with an aspect of the subject invention. In general, the configuration file 200 includes activity elements, prompt elements, and transition elements that are arranged in one or more dialog command groups illustrated at 210 (e.g., group 101, 102, 103, and so forth), wherein such groups specify operations of a user interface or menu to interact with a communications or messaging system. For example, a telephony user interface (TUI) for a unified messaging example is described in an XML configuration file as shown below as Sample 1 in Appendix A. Elements with an "id" attribute describe an activity. For instance, Menu, Record, and so forth are examples of activities. Prompt elements represent prompts to be played to the end-user, whereas Transition elements describe the next activity to be performed and the action to be taken before the transition.

Generally, one possible implementation of a dialog application includes a state machine with each state mapped to an activity in the configuration file 210. State transitions can be mapped to a transition element in XML, for example. Action attributes represent actions to be performed just before a state transition. Also, sub-state machine transitions are also supported in this model. For example, Record Voicemail can be a parent activity that has many sub-activities including menus and record. When in this example illustrated by Sample 1 which is reproduced as Appendix A below, a unified messaging application receives a call from the end-user, the XML configuration pertaining to that call (pre-loaded in memory) can be employed and the entire activity state machine executed for that call. This per-call granularity of loading configuration gives tremendous flexibility for administrators and end-users to extend, customize and support other languages.

Figure 3:
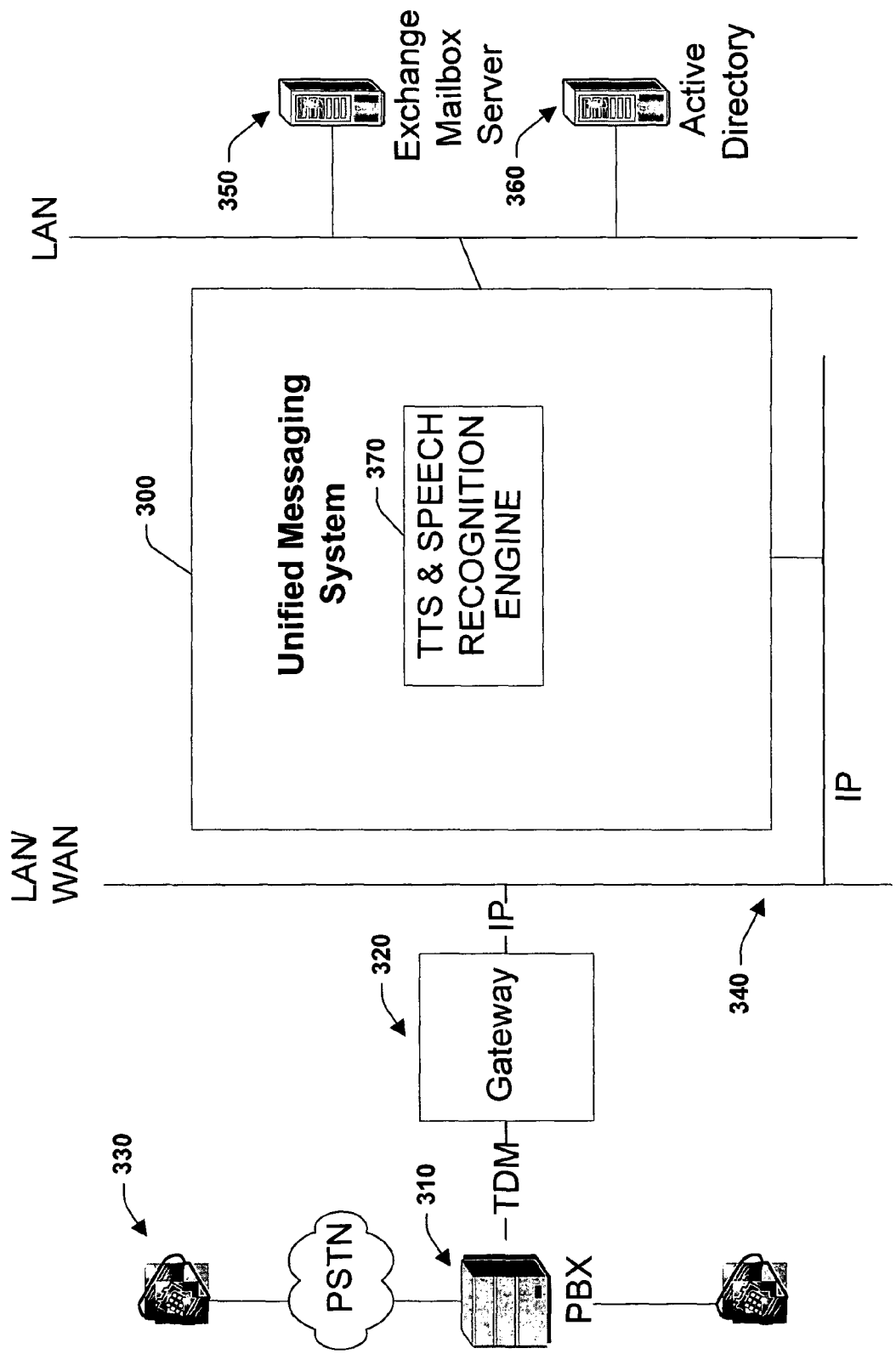
FIG. 3 illustrates exemplary unified messaging system in accordance with an aspect of the subject invention.

Turning to FIG. 3, an example unified messaging system 300 is illustrated in accordance with an aspect of the subject invention. In this example, the system 300 depicts how the unified messaging system 300 cooperates in the context of a PBX 310 and Session Initiation Protocol (SIP) Gateway 320. The Gateway 320 can route calls 330 (wired or wireless) to the unified messaging system 300 over an IP network 340 using the SIP protocol. This allows the unified messaging system 300 to not be collocated with the PBX 310. Other components can include a mailbox server 350 for storing messages and an active directory 360 to manage the messages. As illustrated, the unified messaging system 300 can include components such as a Text-to-Speech (TTS) and speech recognition engine 370 to process incoming calls 330 although other type of components such as a DTMF control can also be provided. As will be described in more detail below, a unified messaging service or service (not shown) can be provided that loads and executes a configuration file to create an interface session to interact with users (or applications) who generate the calls 330. This can include operation of various objects and classes that manage state operations of the system 300.

Figure 4:
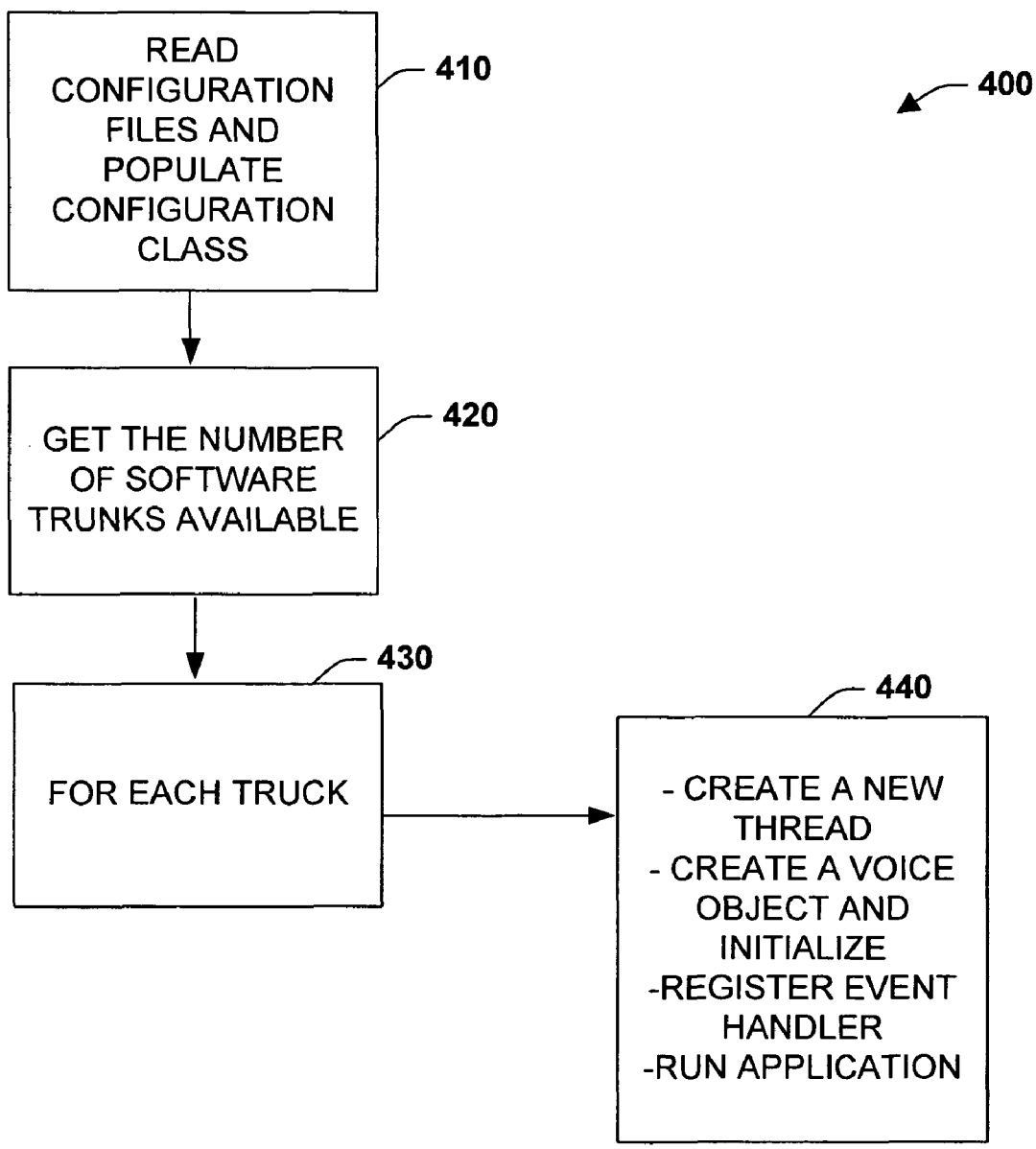
FIGS. 4 and 5 are flow diagrams that illustrate example service processes for managing call activities in accordance with an aspect of the subject invention.
Figure 5:
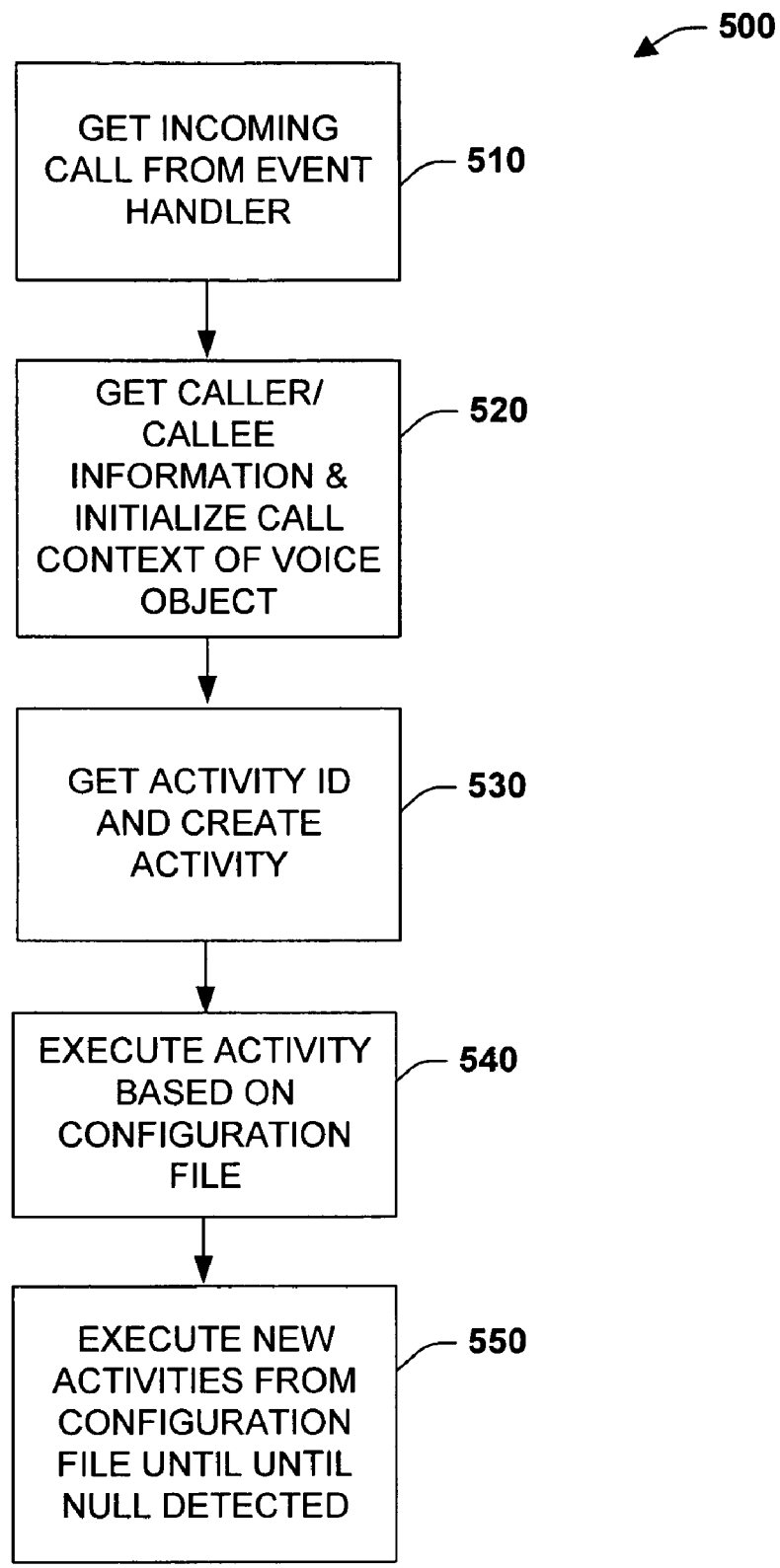

FIGS. 4 and 5 illustrate example service methodologies for managing calls in accordance with an aspect of the subject invention. While, for purposes of simplicity of explanation, the methodologies are shown and described as a series or number of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

FIG. 4 illustrates call flow 400 for a service that interacts with callers during startup of the service. Proceeding to 410, the process reads a Global Configuration XML file and a Unified Messaging Configuration XML file and then populates a unified messaging configuration class. At 420, the number of software trunks available on a given machine are determined and retrieved, wherein the respective trunks are associated with a given caller. At 430, for each trunk described at 420, the following processes can be performed and are illustrated at 440:

a. Create a new thread.
  b. Create a Voice Object in the new thread and initialize the object.
  c. Register for an On Incoming Call event handler; and
  d. Run the service application to process the respective calls. In general, the process waits in that thread. This will start an application message loop for processing calls on the thread to facilitate that the event call back will be executed on the same thread.

FIG. 5 illustrates call flow 500 for a service that interacts with callers during processing of incoming calls. Proceeding to 510 of FIG. 5, the service will call the On Incoming Call registered during startup (described above in FIG. 4) on the same thread which created the Voice Object. At 520, caller, callee and/or other type of call information is retrieved and a Call Context of Voice Object is initialized. At 530, the first Activity Id from the unified messaging configuration file is read and the process creates an Activity from the Activity Id. At 540, an Activity.OnStart function is executed that begins execution of a dialog with the caller based on the contents of the global configuration file described above and/or the unified messaging configuration file. Based on the activity configuration in the unified messaging configuration file, the OnStart function executes one of the functions in the Voice Object (e.g., Play Prompt, Record File, and so forth) asynchronously and then exits the respective thread. At 550, after the Voice Object task is completed, it will call functions such as OnDtmfInput/OnPromptComplete/OnRecordComplete/OnUserHangup/and OnTimeout, for example. This call back creates a new Activity based on the unified messaging configuration file. It is noted that if the new Activity is detected as null, the call can be disconnected at 550, otherwise, the process can proceed back to 540 to execute a new activity.

Figure 6:
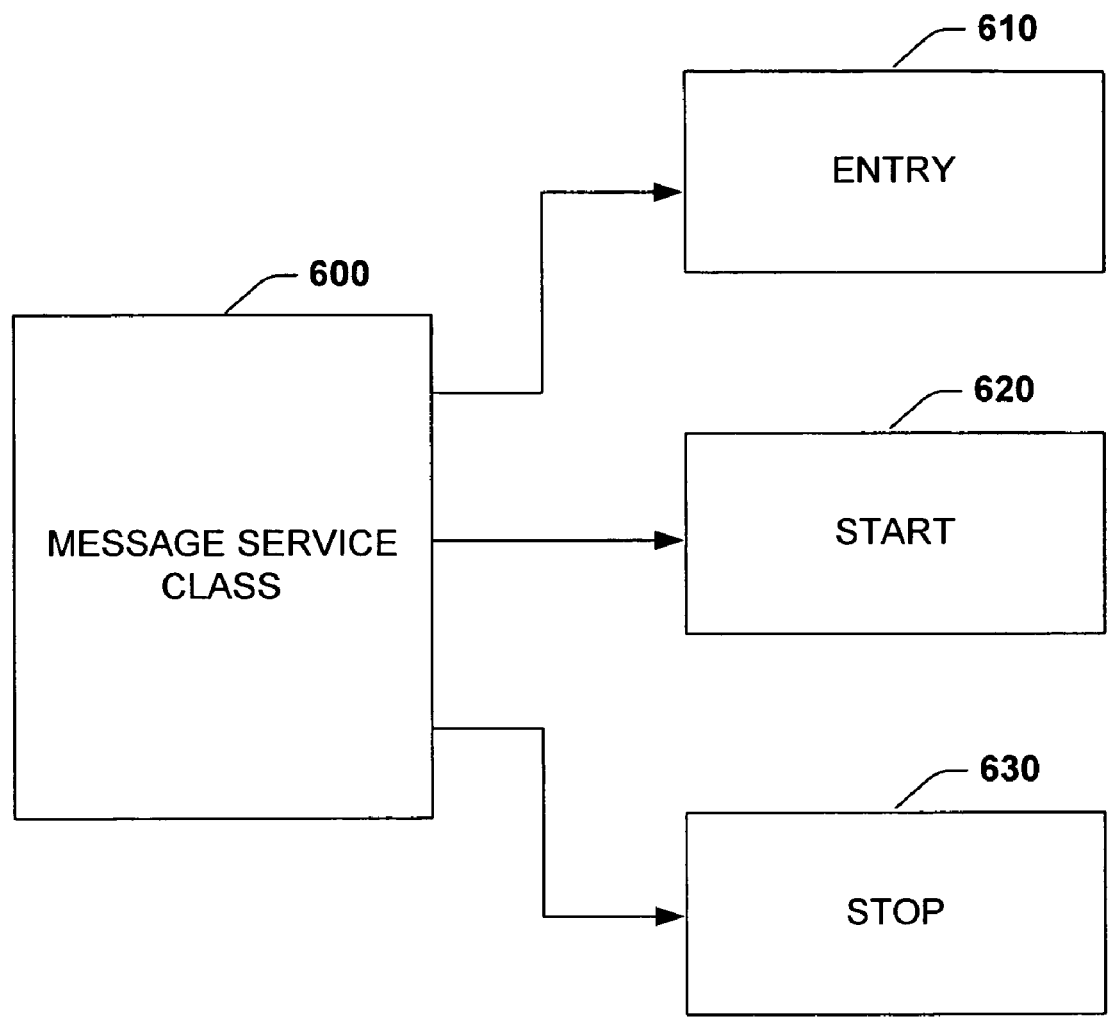
FIG. 6 illustrates an example service class for processing calls in accordance with an aspect of the subject invention.

FIG. 6 illustrates an example service class 600 for processing calls in accordance with an aspect of the subject invention. In this aspect, the message service class 600 is responsible for initializing, creating, and ending interactions with components that process incoming calls and control interfaces for user or application interactions to a messaging system. Aspects to the service class 600 include an entry point 610 to initialize objects that service a call. At 620, the service class includes a start point, whereby configuration files can be read and activities started that are based at least in part upon the files. At 630, the message class 600 employs methods that are executed at the completion of the service such as calling shut down logic that terminates activity with a given caller or trunk. The following code illustrates an example service class 600.

Sample 2:

```
This class implements startup and shutdown code for the service.
public class UMService : System.ServiceProcess.ServiceBase
{
        /// List of top level activity configurations
        internal static ActivityConfigList umconfig = null;
// <summary>
        /// Constructor for UM service called by
/// services.msc.
        /// </summary>
        public UMService( );
        /// <summary>
        /// The entry point when the service is started
/// from the services MSC
        /// </summary>
        protected override void OnStart(string[ ] args)
        {
1.   Read the global configuration file
2.   Read the UM configuration file and build umconfig object
3.   Create IncomingCallControl object
4.   Register IncomingCallHandler as callback with
IncomingCallControl.
5.   Call IncomingCallControl.Start
}
/// <summary>
        /// The entry point when the service is stopped
/// from the services MSC.
        /// </summary>
        protected override void OnStop( )
        {
1.   Call IncomingCallControl.Shutdown
        }
                /// <summary>
/// The entry point when the call is received
/// from Gateway
        /// </summary>
        static void IncomingCallHandler(VoiceObject voiceObject)
        {
1.   Create initial activity (based on the configuration)
2.   Call initial Activity.Start
        }
}
```

Figure 7:
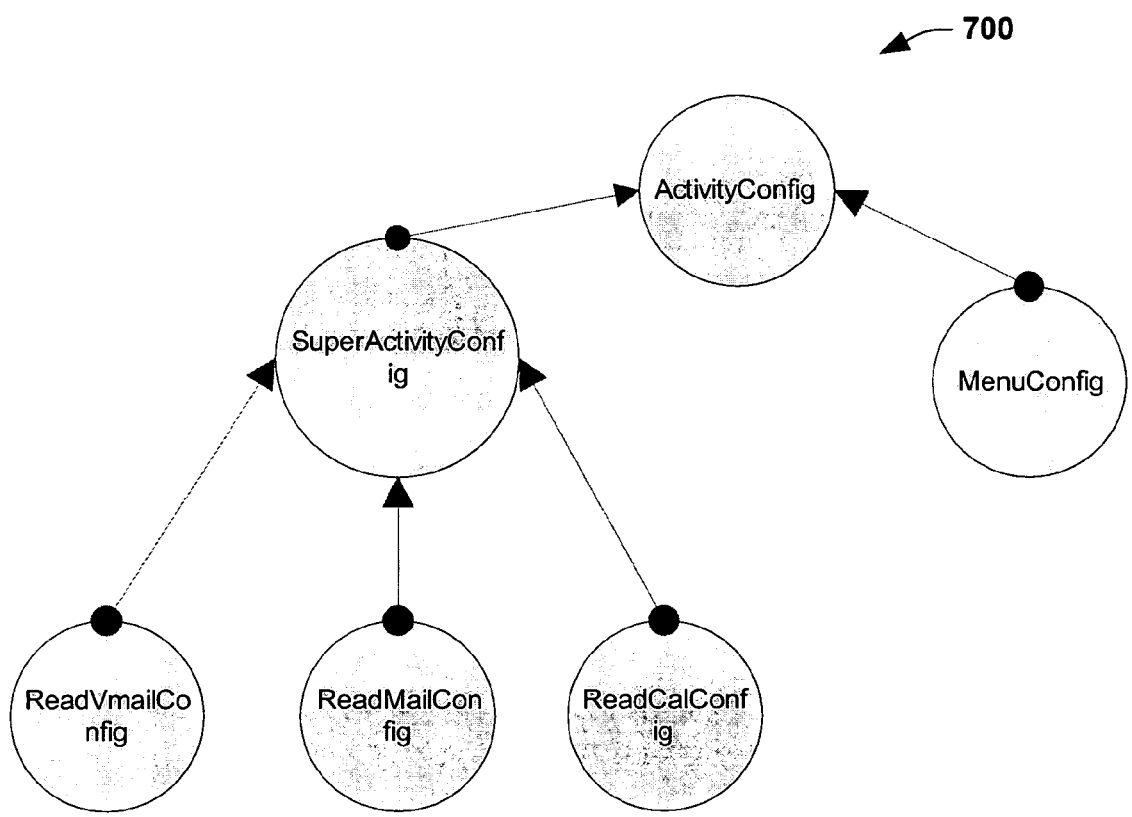
FIG. 7 illustrates an example configuration class for processing calls in accordance with an aspect of the subject invention.

FIG. 7 illustrates an example configuration class 700 for processing calls in accordance with an aspect of the subject invention. The class 700 can be used to store a Configuration File in memory. Each activity in this file contains the prompts to play, DTMF to expect, Action to take on DTMF and next activity to go on DTMF, for example. There are some activities like Read Voice mail which contain its own set of activities. The class 700 shows the inheritance hierarchy of the Activity Configuration classes.

Activity Config is the base class for the activity configurations. This stores a hash table for the events possible and the next Activity for that event for a particular activity. This is based on the Configuration file. The following code example illustrates an example configuration class 700.

Sample 3:

```
/// <summary>
/// base class for activity configuration
/// </summary>
internal abstract class ActivityConfig
{
  protected string     activityId;
```

-continued

```
/// All the actvities peer to this activity
protected ActivityConfigList peerActivities;
/// contains mapping between DTMF and NextActivity.
/// NextActivity is reference into
/// ActivityConfigList.
protected Hashtable    activityDtmfMap;
/// <summary>
// get the activity id
/// </summary>
internal string ActivityId
{
get {return this.activityId;}
}
/// <summary>
    /// Get the next activity based on the DTMF
    /// digits for this activity
    /// </summary>
    internal NextActivity GetNextActivityId(string dtmfDigits);
    /// <summary>
    /// constructor for activity config
    /// </summary>
    internal ActivityConfig(ActivityConfigList config, string activityId);
    // Parses the XML for a activity and populates
    // all the fields like activityDtmfMap, prompts and
    // sub activities, if any.
    // Called from UmConfig.Parse
    internal abstract void Load(XmlNode rootNode);
    // Create a NewActivity object corresponding
    // to this ActivityConfig and return.
    internal abstract Activity CreateNewActivity( );
    /// <summary>
    // Function to add an activity node to
    // activityDtmfMap. This is used by Load.
    // </summary>
    private void AddActivityNode(XmlNode nodeCurrent);
}
```

The following are different activity configurations implemented by an example unified messenger service.

1. MenuConfig: This also stores the prompts for this activity based on the XML.

2. RecordVmailConfig: This also stores the reference to ActivityConfigList with ActivityConfig's local to this Activity.

3. ReadVmailConfig: This also stores the reference to ActivityConfigList with ActivityConfig's local to this Activity.

4. ReadEmailConfig: This also stores the reference to ActivityConfigList with ActivityConfig's local to this Activity.

5. ReadCalendarConfig: This also stores the reference to ActivityConfigList with ActivityConfig's local to this Activity.

6. ReadContactsConfig: This also stores the reference to ActivityConfigList with ActivityConfig's local to this Activity.

Figure 8:
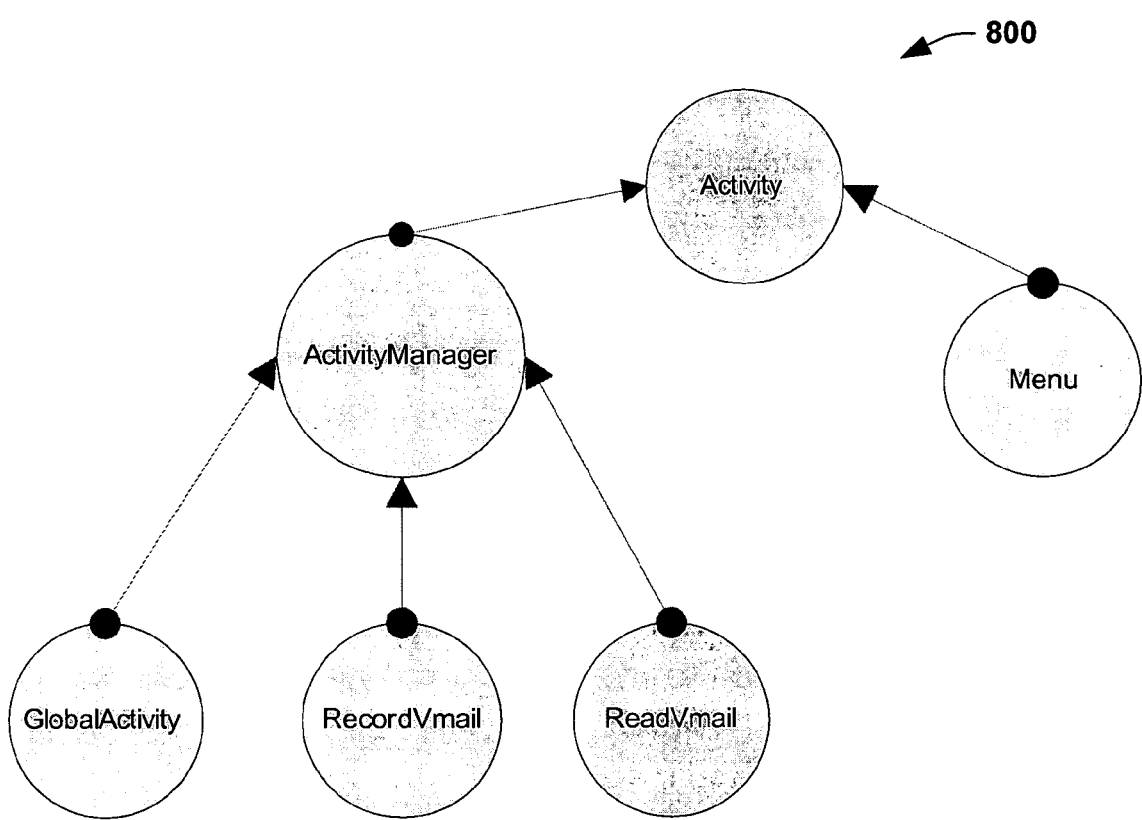
FIG. 8 illustrates an example activity class for processing calls in accordance with an aspect of the subject invention.

FIG. 8 illustrates an example activity class 800 for processing calls in accordance with an aspect of the subject invention. When a call comes into the unified messaging service, it can be handled by a state machine which moves from one state to another based on the configuration file described above. The states in this machine are voice forms which determine the prompts to play, or action to take. The events can be DTMF or speech input from the end user or internal events such as the end of mail.

The Activity class 800 implements one state of the state machines. This is the base class for the activities.

Sample 4:

```
internal abstract class Activity
{
    // Event generated while executing the action
    protected string autoEvent;
    internal Activity( );
    internal abstract void OnStart(VoiceObject voiceObject);
    internal abstract void OnDtmfInput(VoiceObject voiceObject);
    internal abstract void OnUserHangup(VoiceObject voiceObject);
    internal abstract void OnPromptComplete(VoiceObject voiceObject);
    internal abstract void OnRecordComplete(VoiceObject voiceObject);
    internal abstract void OnTimeout(VoiceObject voiceObject);
    protected void ExecuteNextAction(string action, VoiceObject voiceObject)
    {
        1.    Execute the appropriate action based on the action passed to it.
        2.    This can generate autoEvent while executing the action.
    }
}
```

The following are the different activities implemented by the service. These will have a reference to the corresponding Activity Config class which can be passed to the constructor.

1. Menu Activity: Used for playing prompts and wait for user input (DTMF or Speech). This is the basic activity.

2. RecordVmail Activity: Maintains the set of activities required for recording the voice message.

3. ReadVmail Activity: Maintains the set of activities required for to read the voice mail.

4. ReadEmail Activity: Maintains the set of activities required for to read the mails 5. ReadCalendar Activity: Maintains the set of activities required for to read the calendar 6. ReadContacts Activity: Maintains the set of activities required for to read the contact.

Figure 9:
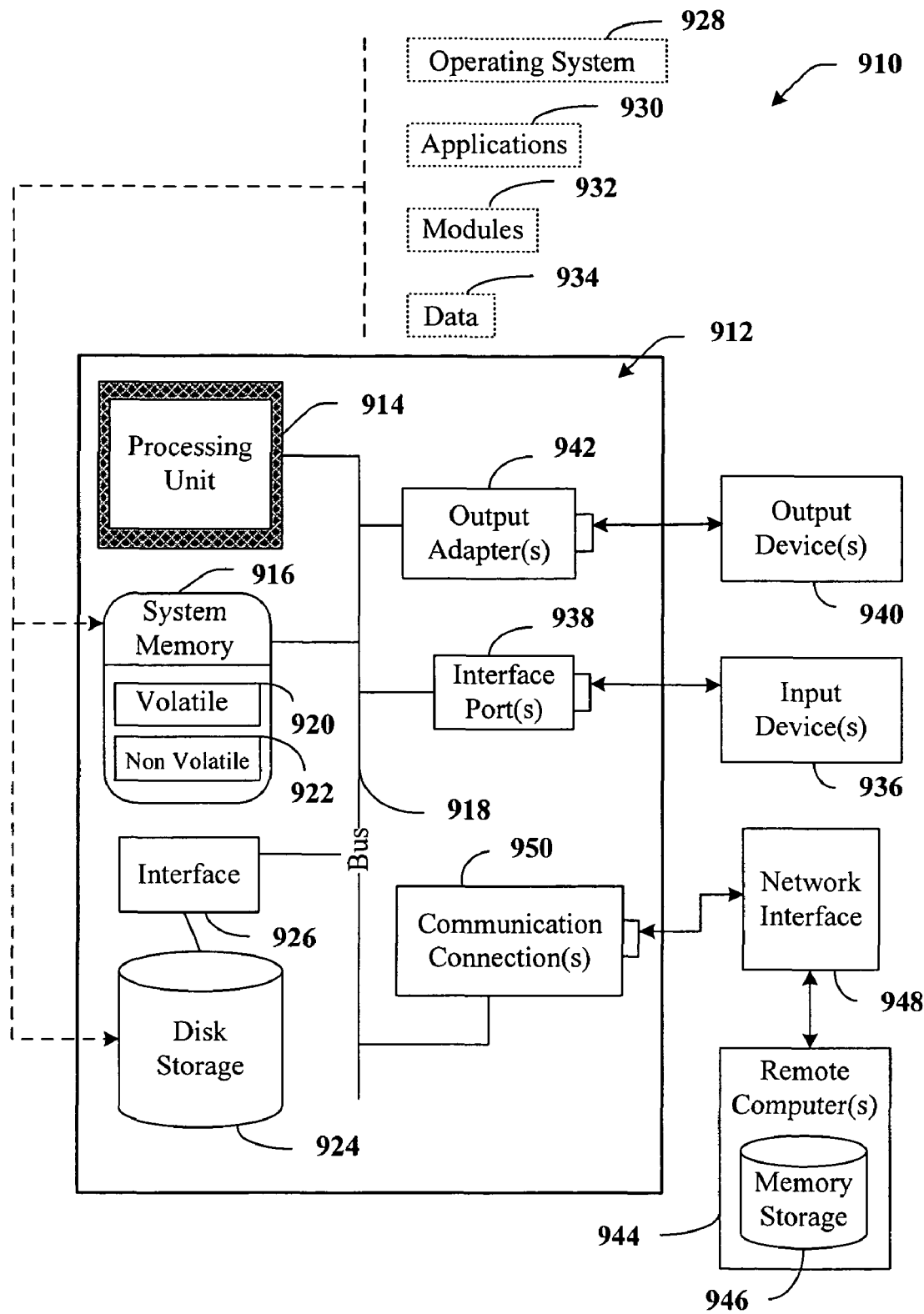
FIG. 9 is a schematic block diagram illustrating a suitable operating environment in accordance with an aspect of the subject invention.

With reference to FIG. 9, an exemplary environment 910 for implementing various aspects of the invention includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the subject invention can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940, that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

Figure 10:
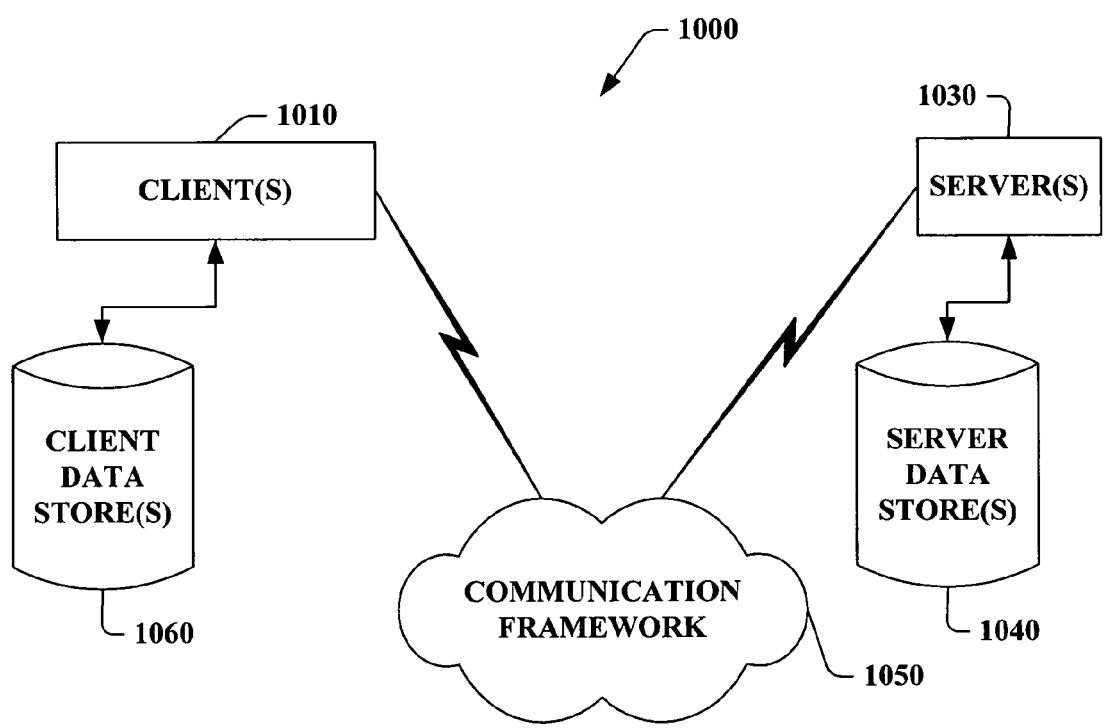
FIG. 10 is a schematic block diagram of a sample-computing environment with which the subject invention can interact.

FIG. 10 is a schematic block diagram of a sample-computing environment 1000 with which the subject invention can interact. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the subject invention, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

APPENDIX A

```
Sample 1
<?xml version="1.0" encoding="utf-8" ?>
<UmConfig firstActivityId="100">
    <!-- Check whether the valid diversion received from gateway -->
    <Menu id = "100" minDtmfSize = "0" maxDtmfSize = "0" dtmfInputValue = "option">
        <Transition event = "noKey" refId = "101" action = "getExtension"></Transition>
        <Transition event = "extensionFound" refId = "700" action = "null"></Transition>
    </Menu>
    <!-- Wecome to Unified Messaging -->
    <Menu id = "101" minDtmfSize = "0" maxDtmfSize = "0" dtmfInputValue = "option">
        <Prompt type = "wave" name = "0020.wav" />
        <Transition event = "noKey" refId = "102" action = "null" />
    </Menu>
    <!-- ONLY Enter Extension or # -->
    <Menu id = "102" minDtmfSize = "1" maxDtmfSize = "6" dtmfInputValue = "option" dtmfStopTones = "#*" interDigitTimeout = "5">
        <Prompt type = "wave" name = "0510.wav"></Prompt>
        <Transition event = "#" refId ="106" action = "validateCaller"></Transition>
        <Transition event = "anyKey" refId = "102" action = "validExtension"></Transition>
        <Transition event = "extensionFound" refId = "700" action = "null"></Transition>
        <Transition event ="invalidExtension" refId = "115" action = "null"></Transition>
        <Transition event = "maxInvalidExtensions" refId = "116" action = "null"></Transition>
        <Transition event = "mailboxFound" refId = "104" action = "getName"></Transition>
        <Transition event = "0" action = "notImplemented" refId = "102" />
        <Transition event = "*" action = "notImplemented" refId = "102" />
    </Menu>
    <Menu id = "103" minDtmfSize = "0" maxDtmfSize = "0" dtmfInputValue = "option">
        <Prompt type = "wave" name = "0000.wav"></Prompt>
        <Transition event = "noKey" refId = "103" action = "disconnect"></Transition>
    </Menu>
    <!-- Enter password -->
```

APPENDIX A-continued

```xml
<Menu id = "104" minDtmfSize="1" maxDtmfSize = "24" dtmfInputValue = "password" dtmfStopTones = "*#" interDigitTimeout = "5" >
    <Prompt type = "tempwave" name = "userName" />
    <Prompt type = "wave" name = "0015.wav" />
    <Transition event = "*" action = "null" refId = "106"/>
    <Transition event = "anyKey" action = "doLogon" refId = "140"/>
    <Transition event = "logonOk" action = "null" refId = "400"/>
    <Transition event = "firstTimeUserTask" action = "null" refId = "600"/>
    <Transition event = "changePasswordTask" action = "null" refId = "600"/>
    <Transition event = "badPasswordDisconnect" action = "null" refId = "141"/>
    <Transition event = "badPasswordLockout" action = "null" refId = "142"/>
</Menu>
<!-- Main Menu -->
<Menu id = "105" minDtmfSize="1" maxDtmfSize = "2" dtmfInputValue = "option">
    <PromptSwitch evaluate = "more">
        <Case condition = "more">
            <Prompt type = "wave" name = "0516.wav" />
        </Case>
        <Case condition = "default">
            <Prompt type = "wave" name = "0515.wav" />
        </Case>
    </PromptSwitch>
    <Transition event = "1" action = "null" refId = "800"/>
    <Transition event = "2" action = "null" refId = "200"/>
    <Transition event = "3" action = "notImplemented" refId = "105"/>
    <Transition event = "4" action = "notImplemented" refId = "105"/>
    <Transition event = "5" action = "null" refId = "130"/>
    <Transition event = "6" action = "null" refId = "600"/>
    <Transition event = "7" action = "notImplemented" refId = "105"/>
    <Transition event = "0" action = "null" refId = "105"/>
    <Transition event = "00" action = "more" refId = "105"/>
    <Transition event = "*" action = "disconnect" refId = "105"/>
</Menu>
<!-- Record Voicemail manager -->
<RecordVoicemail id = "700" firstActivityId = "701">
    <Transition event = "out-1" action = "null" refId = "150"/>
    <!-- Record Voicemail GetGreeting Menu -->
    <Menu id = "701" minDtmfSize = "0" maxDtmfSize = "0" dtmfInputValue = "option">
        <Transition event = "noKey" action = "getGreeting" refId = "702"/>
        <Transition event = "noGreeting" action = "null" refId = "703"/>
    </Menu>
    <!-- Record Voicemail FoundGreeting Menu -->
    <Menu id = "702" minDtmfSize = "0" maxDtmfSize = "0" dtmfInputValue = "option">
        <Transition event = "noKey" action = "null" refId = "704"/>
        <Prompt type = "tempwave" name = "customGreeting"/>
    </Menu>
    <!-- Record Voicemail not FoundGreeting Menu -->
    <Menu id = "703" minDtmfSize = "0" maxDtmfSize = "0" dtmfInputValue = "option">
        <Transition event = "noKey" action = "null" refid = "704"/>
        <Prompt type = "wave" name = "0003a.wav"></Prompt>
        <Prompt type = "text" name = "userName"/>
    </Menu>
    <!-- Record Voicemail Main Menu -->
    <Menu id = "704" minDtmfSize = "0" maxDtmfSize = "1" dtmfInputValue = "option">
        <Transition event = "noKey" action = "null" refId = "705"/>
        <Transition event = "*" action = "fillCallerInfo" refId = "out-1"/>
        <Prompt type = "wave" name = "0000.wav"></Prompt>
    </Menu>
    <Record id = "705" saveTo = "voicemailMessage" minDtmfSize = "1" maxDtmfSize = "1" dtmfStopTones="#*">
        <Transition event = "#" action = "recordPlayTime" refId = "706"/>
        <Transition event = "*" action = "clearVoiceMail" refId = "713" />
        <Transition event = "anyKey" action = "recordPlayTime" refId = "706"/>
        <Transition event = "silence" action = "null" refId = "709" />
```

APPENDIX A-continued

```
            <Transition event = "timeout" action = "null" refId = "706" />
        </Record>
        <!-- Record Voicemail after Record Menu -->
        <Menu id = "706" minDtmfSize = "1" maxDtmfSize = "2" dtmfInputValue = "option">
            <PromptSwitch evaluate = "more">
                <Case condition = "more">
                    <Prompt type = "wave" name = "0501.wav" />
                </Case>
                <Case condition = "default">
                    <Prompt type = "wave" name = "0500.wav" />
                <Case>
            </PromptSwitch>
            <Transition event = "11" action = "notImplemented" refId = "706"/>
            <Transition event = "1" action = "submitVoiceMail" refId = "707"/>
            <Transition event = "2" action = "null" refId = "708"/>
            <Transition event = "3" action = "clearVoiceMail" refId = "704"/>
            <Transition event = "4" action = "notImplemented" refId = "706"/>
            <Transition event = "0" action = "null" refId = "706"/>
            <Transition event = "00" action = "more" refId = "706"/>
            <Transition event = "*" action = "clearVoiceMail" refId = "713"/>
        </Menu>
        <Menu id = "707" minDtmfSize = "0" maxDtmfSize = "0" dtmfInputValue = "option">
            <Prompt type = "wave" name = "1075.wav" ></Prompt>
            <Prompt type = "wave" name = "0565.wav" ></Prompt>
            <Transition event = "noKey" refId = "707" action = "disconnect"></Transition>
        </Menu>
    </RecordVoicemail>
</UmConfig>
```

What is claimed is:

1. A configurable unified messaging system, comprising:
a processor device; and
at least one memory device, the memory device storing:
a configuration file of the unified messaging system, wherein the configuration file defines multiple dialog command groups, the dialog command groups each identifying operations of a voice interface dialog session, wherein the operations are defined in the dialog command groups by prompt elements, activity elements, and transition elements in an extensible markup language, wherein the configuration file identifies a plurality of options to be presented to a user by the prompt elements during the voice dialog session, wherein each activity element identifies an activity to be performed during the voice dialog session, and wherein each transition element identifies a transition to be performed after one of the activities during the voice dialog session; and
computer-executable instructions, which when executed by the processor device cause the processor device to generate a state controller and a Text-to-Speech engine upon receipt of one of the incoming telephone calls, the state controller using the dialog command groups of the configuration file to generate the voice interface dialog session with a user, wherein the voice interface dialog session performs operations including: presenting to the user an audible menu including a plurality of options defined by the configuration file, receiving an input from the user selecting an option from the audible menu, executing an activity with an activity element, the activity element being associated with the option in the configuration file, and performing a transition defined by a transition element identified in the configuration file after the activity, the Text-to-Speech engine converting information from a text form to an audible form, wherein at least one of the activity elements calls the text-to-speech engine to convert text from an electronic message into an audible form through the voice interface dialog session.

2. The system of claim 1, wherein the configuration file describes one or more prompt elements to solicit information from the user, wherein a prompt element is a simulated or recorded speech prompt conveyed to the user during the computerized speech dialog session.

3. The system of claim 2, further comprising a message processing component to execute the configuration file and interact with the state controller.

4. The system of claim 1, further comprising a component to receive speech or dual tone multi frequency (DTMF) inputs.

5. The system of claim 1, wherein the configuration file and the state controller are associated with a unified messaging application.

6. The system of claim 1, wherein the activity element includes at least one of a prompt element to play to the user, a response to expect from the user, or an action to take on receiving a response from the user, wherein a prompt element includes a simulated or recorded speech prompt conveyed to the user during the computerized speech dialog session.

7. The system of claim 1, further comprising a service that operates at least one of a configuration class and an activity class to operate the dialog session.

8. The system of claim 1, further comprising at least one of a gateway component, a protocol component, a mailbox server, and a directory server to facilitate interactions with users or applications.

9. The system of claim 1, further comprising a global configuration file that cooperates with the configuration file to enable the dialog session.

10. The system of claim 1, further comprising at least one voice object to support the dialog session.

11. The system of claim 10, wherein the voice object stores speech data in a digitized audio file.

12. The system of claim 1, wherein the computer-executable instructions further cause the processor device to perform each of the following:
control a menu operation, a record voice mail activity, a read voice mail activity, a read e-mail activity, a read calendar activity, and a read contacts activity.

13. A computer readable medium having computer readable instructions stored thereon for implementing the components of claim 1.

14. A method of operating a configurable unified messaging system, comprising:
receiving a telephone call from a telephone network;
reading a configuration file of the unified messaging system from memory with a processing device upon receipt of the telephone call, the configuration file defining multiple dialog command groups, the dialog command groups each identifying operations of a voice interface dialog session, wherein the operations are defined in the dialog command groups by a plurality of elements including prompt elements, activity elements, and transition elements in an extensible markup language, the prompt elements identifying options to be presented during the voice interface dialog session, the activity elements identifying activities to be performed during the voice interface dialog session, and transition elements identify transitions to be performed during the voice interface dialog session after the activities; and
generating voice interface dialog session with a user with a computing device by:
presenting to the user an audible menu including the plurality of options defined by one of the prompt elements identified in the configuration file;
receiving an input from the user selecting one of the options from the audible menu, the one of the options being associated with an electronic message including text information;
executing the activity associated with the input and defined by one of the activity elements identified in the configuration file, wherein the activity retrieves the electronic message from an e-mail mailbox server and utilizes a Text-to-Speech engine to convert the text information from the electronic message to an audible form that is presented to the user through the voice interface dialog session; and
performing a transition defined by a transition element identified in the configuration file after the activity.

15. The method of claim 14, further comprising creating a service having a configuration class or an activity class to operate the configuration file.

16. The method of claim 14, further comprising programming the configuration file with multiple human spoken language options for the activities, prompts and transitions.

17. The method of claim 14, further comprising employing a wireless protocol to operate the interface session.

18. A method of operating a configurable unified messaging system, the method comprising:
receiving with a network communication device of the configurable unified messaging system an incoming call from a user, the incoming call being received through an Internet Protocol network routed to the configurable unified messaging system by a gateway, wherein the configurable unified messaging system is also in data communication with an electronic mail server;
reading a configuration file from memory with the configurable unified messaging system upon receipt of the incoming call, the configuration file defining multiple dialog command groups, the dialog command groups each identifying operations of a voice interface dialog session, wherein the operations are defined in the dialog command groups by a prompt element, an activity element, and a transition element in an extensible markup language, wherein the configuration file includes data conforming to an extensible markup language specification;
determining with the configurable unified messaging system the prompt element identified in the configuration file;
executing with the configurable unified messaging system the prompt element to present an audible menu to the user including a plurality of options;
receiving with the configurable unified messaging system a dual-tone multi-frequency input to select one of the options associated with an electronic message stored in the electronic mail server, the electronic message including text information;
determining with the configurable unified messaging system a first activity element associated with the option in the configuration file;
executing the activity element to perform an activity, the activity converting with a Text-to-Speech engine the text information from the electronic message into an audible form that is presented to the user through the voice interface dialog session;
determining with the configurable unified messaging system a transition element which the configuration file identifies as following the activity; and
executing the transition element after the activity has completed.

* * * * *